(12) United States Patent
Ferron (10) Patent No.: US 11,963,641 B2
(45) Date of Patent: Apr. 23, 2024

(54) VESSEL FOR COOKING FOOD AND ITS RESPECTIVE ENHANCED THERMAL SIGNALING DEVICE

(71) Applicant: ZWILLING BALLARINI ITALIA SRL, Rivarolo Mantovano (IT)

(72) Inventor: Francesco Ferron, Casalmaggiore (IT)

(73) Assignee: ZWILLING BALLARINI ITALIA SRL, Rivarolo Mantovano (IT)

( * ) Notice: Subject to any disclaimer, the term of this patent is extended or adjusted under 35 U.S.C. 154(b) by 561 days.

(21) Appl. No.: 17/281,943

(22) PCT Filed: Sep. 23, 2019

(86) PCT No.: PCT/IB2019/058039
§ 371 (c)(1),
(2) Date: Mar. 31, 2021

(87) PCT Pub. No.: WO2020/099952
PCT Pub. Date: May 22, 2020

(65) Prior Publication Data
US 2021/0378453 A1 Dec. 9, 2021

(30) Foreign Application Priority Data
Nov. 16, 2018 (IT) .......................... 102018000010408

(51) Int. Cl.
*A47J 45/06* (2006.01)
(52) U.S. Cl.
CPC ........... *A47J 45/068* (2013.01); *A47J 45/061* (2013.01); *A47J 2202/00* (2013.01)
(58) Field of Classification Search
CPC ..... A47J 45/069; A47J 45/061; A47J 2202/00
(Continued)

(56) References Cited

U.S. PATENT DOCUMENTS

2004/0163548 A1* 8/2004 Pacenti ................. A47J 45/068
99/422
2004/0184511 A1* 9/2004 Kwon ................... A47J 45/068
374/208
(Continued)

FOREIGN PATENT DOCUMENTS

EP 2623002 A1 8/2013
GB 2429285 A 2/2007
(Continued)

OTHER PUBLICATIONS

International Search Report and Written Opinion dated Jan. 3, 2020 for PCT/IB2019/058039 to Zwilling Ballarini Italia Srl filed Sep. 23, 2019.

*Primary Examiner* — Omar Flores Sanchez
(74) *Attorney, Agent, or Firm* — Vorys, Sater, Seymour and Pease LLP (57) ABSTRACT

Cooking food vessel including a metal body, a handle, constrained to a portion of the metal body via a metal fixing element, a metal flame guard ring, placed in contact with a metal body portion to provide thermal conduction, and a thermal signalling device including at least one bimetal sheet formed of a first metal material and a second metal material having coefficients of thermal expansion different from each other. The bimetal sheet is placed in contact with components having thermal conductivity properties and is preset for signalling attainment of predefined heating value by progressive mechanical movement related to the cooking vessel becoming hot. The flame guard ring has one or more through holes and the bimetal sheet shaped and dimensioned so at least one indicating portion thereof is at least partially visible through the through holes at a specific temperature value.

20 Claims, 8 Drawing Sheets

(58) Field of Classification Search
USPC .......................................................... 99/342
See application file for complete search history.

(56) References Cited

U.S. PATENT DOCUMENTS

| | | | | |
|---|---|---|---|---|
| 2005/0242086 A1* | 11/2005 | Imura | ................... | A47J 36/321 |
| | | | | 219/627 |
| 2006/0225502 A1* | 10/2006 | Ferron | ................... | G01K 11/12 |
| | | | | 374/E11.018 |
| 2007/0095215 A1 | 5/2007 | Ho et al. | | |
| 2010/0156645 A1* | 6/2010 | Beck | ..................... | A47J 36/321 |
| | | | | 340/602 |
| 2021/0345834 A1* | 11/2021 | Ferron | ................... | A47J 45/068 |
| 2022/0053979 A1* | 2/2022 | Jenkins | ................... | A47J 36/32 |

FOREIGN PATENT DOCUMENTS

| | | |
|---|---|---|
| KR | 20-0472742 Y1 | 5/2014 |
| KR | 20-0472743 U | 5/2014 |

\* cited by examiner

VESSEL FOR COOKING FOOD AND ITS RESPECTIVE ENHANCED THERMAL SIGNALING DEVICE

CROSS-REFERENCE TO RELATED APPLICATIONS

This is a § 371 National Stage Application of International Application No. PCT/M2019/058039 filed on Sep. 23, 2019, claiming the priority of Italian Patent Application No. 102018000010408 filed on Nov. 16, 2018.

The present invention generally relates to a vessel for cooking food and, in particular, to an enhanced thermal signalling device for a vessel for cooking food.

In the technical field of vessels for cooking food, systems and devices are known for informing a user of a vessel for cooking food, such as for instance a pan, about the thermal condition reached by the vessel itself, so as to provide for a correct cooking and make it possible to monitor the cooking process and adjust the amount of heat to supply. The heat supplied by way of gas or electricity is usually high upon start of use, in order to bring the cooking vessel to a desired temperature, whereas its amounts shall be reduced once reaching the desired temperature, in order not to overheat the cooking vessel, which would damage quality of cooking. Pans are usually the cooking vessels for which a control of their respective thermal condition is most critical, in that such type of kitchen utensil needs a thermal control because of its being use at high temperatures not damped by liquids contents.

The most used thermal signalling systems make reference to chromatic variations provided by pigments which, upon reaching specific temperatures, change colour, thus providing a visual information. Thermochromic systems exist that are placed directly inside the cooking vessel, via pigments incorporated in the non-stick coating placed on the inner surface of the vessel itself. If change of colour is expected to take place at a predefined temperature, such as for instance 180° C., the colour changes as soon as this predefined temperature is reached, whereby the user can adjust the thermal power to be supplied to the cooking vessel according to his/her requirements.

The thermochromic systems feature two main limitations:
  pigments shall be resistant to highest cooking temperatures, whose peaks might reach 300° C. The change of colour of (inorganic) pigments resistant to high temperatures is very slender and difficult to appreciate. Comparison systems activated in a more or less wide zone of the bottom of the cooking vessel are used to identify such change of colour;
  the bottom of the cooking vessel, where the colour-changing areas are placed, is usually covered by the food to be cooked, so as to prevent or at least to limit the view of the change of colour.

These are the reasons why thermal signalling systems have been implemented that aim at overcoming the above described limitations, while using thermochromic pigments. In these thermal signalling systems, the thermochromic pigments are placed into paints which coat specific component parts placed in the immediate periphery of the cooking vessel. For example, should the cooking vessel be a pan, the thermochromic pigments are placed on that metal part of the handle that is closest to the edge of the pan.

However, in a cooking vessel provided with these thermal signalling systems, the increase of temperature at the component part that incorporates the thermochromic pigments takes place after a certain time delay with respect to the increase of temperature taking place at the cooking bottom. This occurs because of the time necessary for heat to be transferred from the cooking bottom, which is closer to the thermal source, to the component part under consideration. For example, the cooking bottom might be at a temperature of 180° C., whereas the component part that incorporates the thermochromic pigments might be at a temperature not exceeding 60° C. Therefore, pigments that change colour at a temperature of 60° C. will be used to signal that the cooking bottom reached a temperature of 180° C.

The advantage of using pigments that change colour at a low temperature is in that the difference in colour is very well defined, for example from green to red. However, such advantage is partially neutralized by the thermal resistance limitations of such (organic) pigments which tend to deactivate and not to come back to their initial status if submitted to a long-lasting cooking with temperatures exceeding 200° C.

More sophisticated thermal signalling systems also exist, based on the use of thermocouples incorporated inside the metal thickness of the bottom of the cooking vessel. The temperature assessed by the thermocouples is finally read and signalled by a battery powered electronic device, generally placed at the end section of the handle of the cooking vessel.

The thermocouple-based thermal signalling systems feature at least two main limitations:
  they require a complex radial drilling operation of the bottom of the cooking vessel in order to place the thermocouple therein;
  by its nature and because of the presence of a battery, the electronic device used to read and signal the temperature does not resist to the water and to the temperature of a dishwasher, and in any case to an even accidental exposure to high temperatures, as it often happens on a cooktop.

Also, the thermocouple-based thermal signalling systems are expensive and little practical, because of the requirement for them of being removable.

Finally, thermal signalling systems for cooking vessels exist based on a progressive mechanical movement of a specific component part. This movement is obtained upon reaching a given thermal heating value of the cooking vessel. This component part, as described for instance in documents KR 2004-0072742 U and KR 2004-0072743 U, consists of a bimetal sheet comprising two metals featuring different coefficients of thermal expansion.

In the thermal signalling systems according to documents KR 2004-0072742 U and KR 2004-0072743 U, their respective bimetal sheets control the movement and/or rotation of specific devices resembling thermal indicators. This means that they are rather complex and little reliable mechanisms. A further thermal signalling system, applied onto a vessel for cooking food according to the preamble of claim 1, is described in document GB 2 429 285 A.

An object of the present invention is therefore that of providing an enhanced thermal signalling device for a vessel for cooking food that is capable of solving the above-mentioned drawbacks of the prior art in an extremely simple, cost-effective, and particularly functional manner.

In details, an object of the present invention is that of providing an enhanced thermal signalling device for a vessel for cooking food that is thermally more stable and reliable than the devices according to the prior art.

Another object of the present invention is that of providing an enhanced thermal signalling device for a vessel for cooking food that is constructively simpler than the devices according to the prior art.

These objects and others according to the present invention are achieved by implementing a vessel for cooking food and a respective enhanced thermal signalling device as set forth in claim 1.

Further features of the invention are highlighted by the dependent claims, which are an integral part of the present disclosure.

The features and advantages of an enhanced thermal signalling device for a vessel for cooking food according to the present invention will be more apparent from the following description, which is provided for explanatory non-limitative purposes, which makes reference to the attached schematic drawings, wherein.

With reference to the figures, a vessel for cooking food and a respective enhanced thermal signalling device according to the present invention are shown. The vessel for cooking food is identified by the reference numeral 10 as a whole and is illustrated in the form of a pan for explanatory purposes only.

The cooking vessel 10 comprises a metal body 12 comprising in turn a bottom wall 14 and at least one side wall 16 which extends from such bottom wall 14. In the embodiment shown in the figures, the cooking vessel 10 is a conventional pan provided with a substantially circular bottom wall 14. The pan comprises one side wall 16 only which extends from the bottom wall 14 and, more specifically, from the circular edge of the bottom wall 14. In any case, the cooking vessel 10 might also be provided with a plurality of side walls 16, for example the cooking vessel 10 might have a bottom wall 14 featuring a quadrilateral shape. Irrespective of the shape of the cooking vessel 10, the side wall 16 extends from the bottom wall 14 in a conventional and intrinsically known manner, so as to define an inner compartment 18 of the cooking vessel 10 wherein food is placed for being cooked.

The cooking vessel 10 also comprises at least one handle 20, preferably made of a non-metal material. The handle 20 is constrained to a portion of the metal body 12, typically consisting of the side wall 16, via a metal fixing element 22. The handle 20 can be in turn constrained to the metal fixing element 22 by way of known systems such as, for example, a screw 24.

At least one metal flame guard ring 28 having a substantially annular shape is arranged about an end 26 of the handle 20 at the metal fixing element 22. The metal flame guard ring 28 is placed in contact with a portion of the metal body 12, typically consisting of the side wall 16, so as to allow thermal conduction between the metal body 12 and the metal flame guard ring 28 itself.

Figure 1:
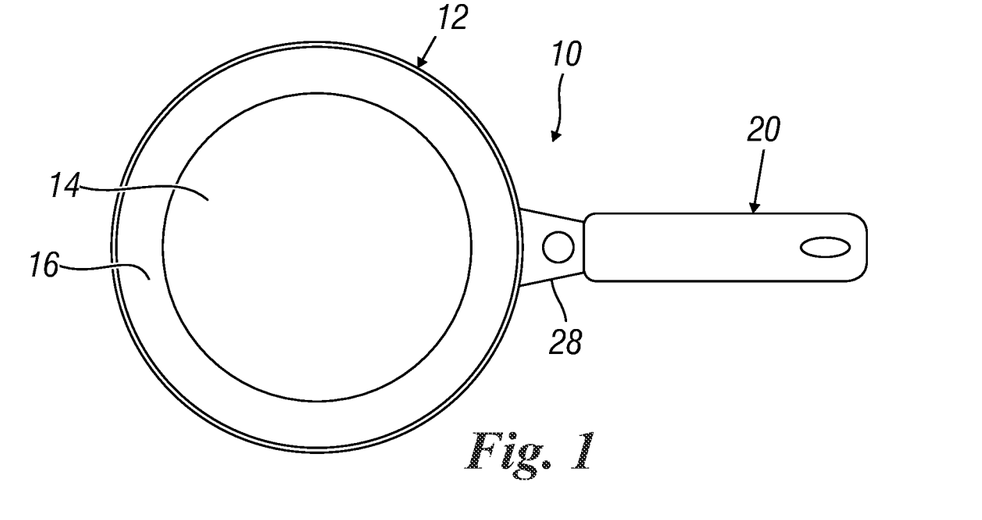
FIG. 1 is a top view of a vessel for cooking food that can be provided with an enhanced thermal signalling device according to the present invention.
Figure 2:
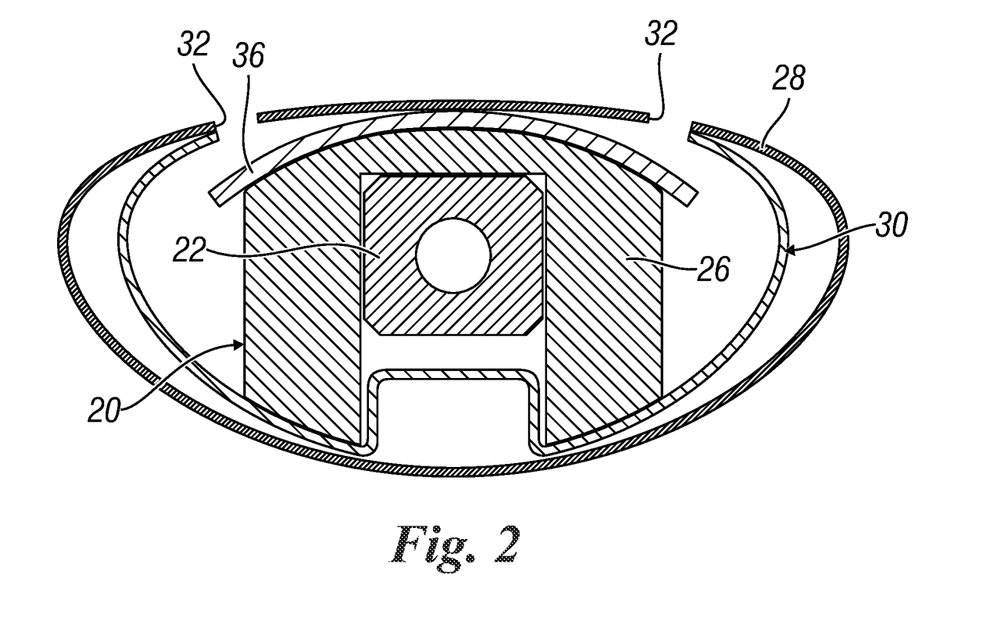
FIG. 2 is a cross sectional view of an embodiment of the enhanced thermal signalling device according to the present invention.
Figure 3:
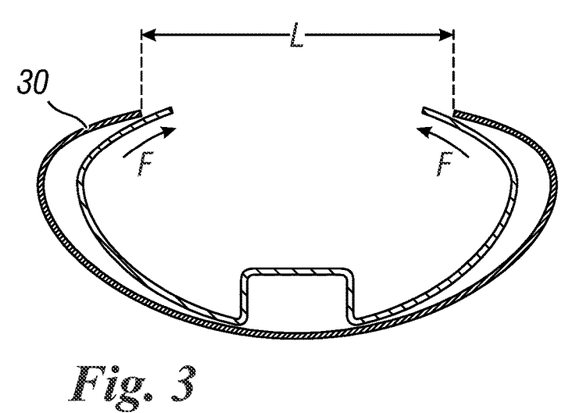
FIG. 3 is a schematic view which shows the operating principle of the enhanced thermal signalling device of FIG. 2.

At least one thermal signalling device is applied inside the metal flame guard ring 28 and comprises at least one bimetal sheet 30 consisting of a first strip 30A of a first metal material and a second strip 30B of a second metal material welded together, wherein the first metal material and the second metal material feature different coefficients of thermal expansion. The thermal signalling device is preset for indicating the attainment of a predefined heating value of the cooking vessel 10 by way of a progressive mechanical movement of the bimetal sheet 30 related to an increase of temperature of the cooking vessel 10 itself, as schematically shown in FIG. 3.

The first metal material and the second metal material might consist of, for example, pure aluminium, which has a coefficient of linear thermal expansion equal to $0.000024°$ $C.^{-1}$, and chromium stainless steel, which has a coefficient of linear thermal expansion equal to approx. $0.000012°$ $C.^{-1}$ (approximately half the coefficient of thermal expansion of aluminium), respectively. These materials are mentioned for explanatory purposes only, in that the first metal material and the second metal material that form the bimetal sheet 30 might even be materials different from those mentioned above. Preferably the ratio between the coefficient of thermal expansion of the first metal material and the coefficient of thermal expansion of the second metal material is at least 1.4:1 in order to cause significant movements.

The bimetal sheet 30, being properly shaped, tends to get deformed when heated, and to "bend" about the metal material that stretches the least or, in other words, that features the lower coefficient of linear thermal expansion. Therefore, should the bimetal sheet 30 be substantially shaped like an open ring or a "C", as illustrated in the schematic drawing of FIG. 3, it will tend to stretch in the direction indicated by the arrows F as temperature increases. Consequently, if the C-shaped open ends of the bimetal sheet 30 are at a given distance L under ambient temperature condition, such open ends, on which respective indicating portions 34 are derived, will tend to get closer to each other as temperature increases, thus progressively reducing the distance L.

The bimetal sheet 30 is placed at least partially in contact with one or more component parts of the cooking vessel 10 featuring good thermal conductivity properties, such as, for example, the metal flame guard ring 28, the metal fixing element 22, and/or the screw 24 used to constrain the handle 20 to the metal fixing element 22. Preferably is the heat of the cooking vessel 10 transferred to the bimetal sheet 30 via the contact with just the metal flame guard ring 28. However, both the metal flame guard ring 28 and the metal fixing element 22 are placed in contact with their respective portions of such bimetal sheet 30 in order to further guarantee a transfer of heat from the cooking vessel 10 to the bimetal sheet 30.

In order to make said configuration suitable for signalling a thermal status, the metal flame guard ring 28 is provided with one or more through holes, slots or windows 32, as shown in the embodiments of FIGS. 5A, 5B, 6A, 6B, 6C, and 7. The bimetal sheet 30 is shaped and dimensioned in such a way that at least one indicating portion 34 of such bimetal sheet 30 is at least partially visible through the through holes, slots or windows 32 (for example, by obstructing them) at a specific temperature value. As will be better specified below, this specific temperature value is either coincident with the predefined heating value that indicates an increase of the temperature of such cooking vessel 10 or coincident with the ambient temperature, depending on the actual embodiment of the cooking vessel 10.

In order to better display the attainment of a predefined heating value or, in other words, of a given increment of temperature of the cooking vessel 10, at least the indicating portions 34 of the bimetal sheet 30 are coloured with a first predefined colour, preferably red, and different from the colour with which the remaining portions of said bimetal sheet 30 are coloured. In this way, whenever the cooking vessel 10 reaches or exceeds said predefined heating value, the user can immediately get informed about this thermal condition by looking at the through holes, slots or windows 32 becoming red.

In addition, provisions might be taken to colour the end 26 of the handle 20 with a second predefined colour, preferably green, and different from the first predefined colour. Alternatively, the thermal signalling device might comprise at least one plate 36 placed at the through holes, slots or windows 32. The plate 36 is also coloured with the second predefined colour, preferably green, and different from the first predefined colour with which at least the indicating portions 34 of the bimetal sheet 30 are coloured. Consequently, with reference to the operating mode illustrated in FIG. 8, the following information can be provided to a user:
under ambient temperature conditions, or cold conditions, the green colour of the end 26 of the handle 20 or of the plate 36 is visible through the through holes, slots or windows 32;
upon reaching a predefined heating value that is greater than the ambient temperature, or hot conditions, the through holes, slots or windows 32 are obstructed by the indicating portions 34 or, in other words, the first predefined colour (red) of the indicating portions 34 of the bimetal sheet 30 is at least partially visible through such through holes, slots or windows 32.

In the embodiments of FIGS. 5A, 5B, 6A, 6B, 6C, and 7, wherein there are provided two or more through holes, slots or windows 32 aligned to each other, the arrangement and the geometry of such through holes, slots or windows 32 makes it possible to provide information on the progressive increase of the temperature of the cooking vessel 10. As a matter of fact, as temperature increases, also the number of through holes, slots or windows 32 through which the red coloured indicating portions 34 of the bimetal sheet 30 are visible increases. In other words, the temperature of the cooking vessel 10 will be as higher as more surface of the through holes, slots or windows 32 is red coloured.

The dimensions of the bimetal sheet 30 and the positions of the through holes, slots or windows 32 are properly engineered so that the red colour thermal signalling takes place upon reaching a predefined heating value of the cooking vessel 10 that is suitable for cooking most foods. This predefined heating value is typically higher than 150° C.

Figure 4:
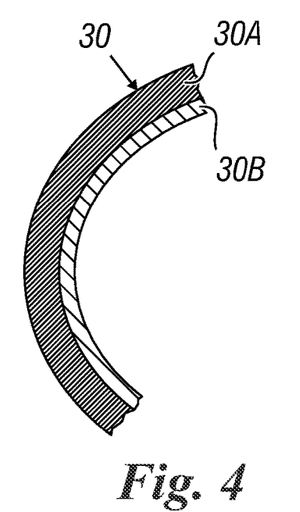
FIG. 4 is an enlarged view of a detail of the enhanced thermal signalling device of FIG. 2.
Figure 5A:
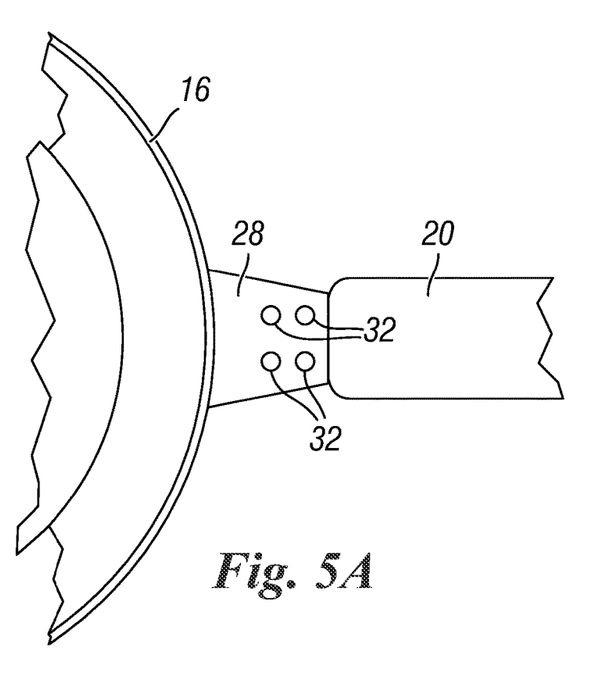
FIGS. 5A, 5B, 6A, 6B, 6C, and 7 show different embodiments of the enhanced thermal signalling device according to the present invention applied onto a vessel for cooking food.
Figure 5B:
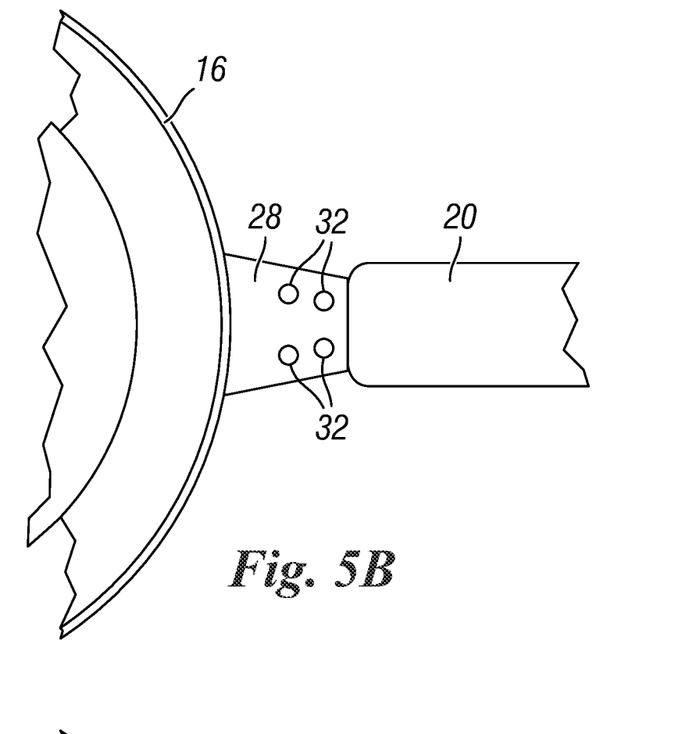
Figure 6A:
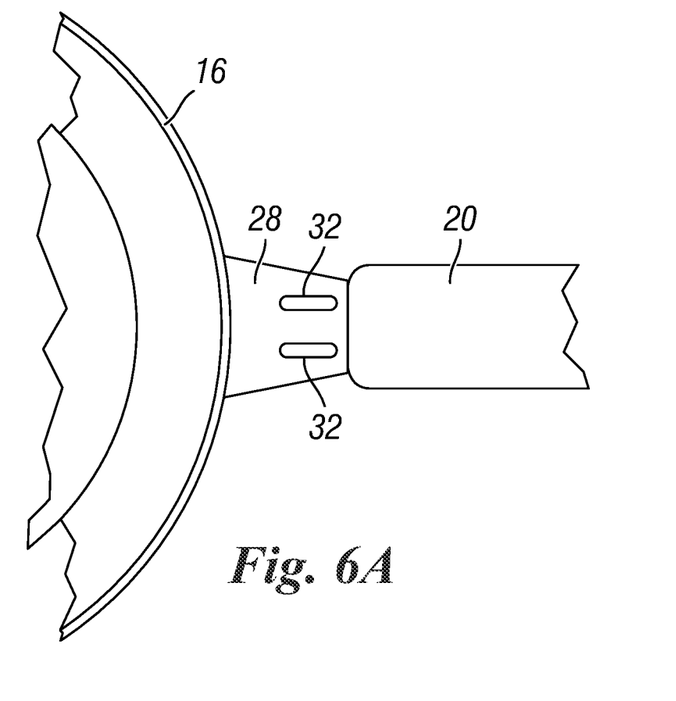
Figure 6B:
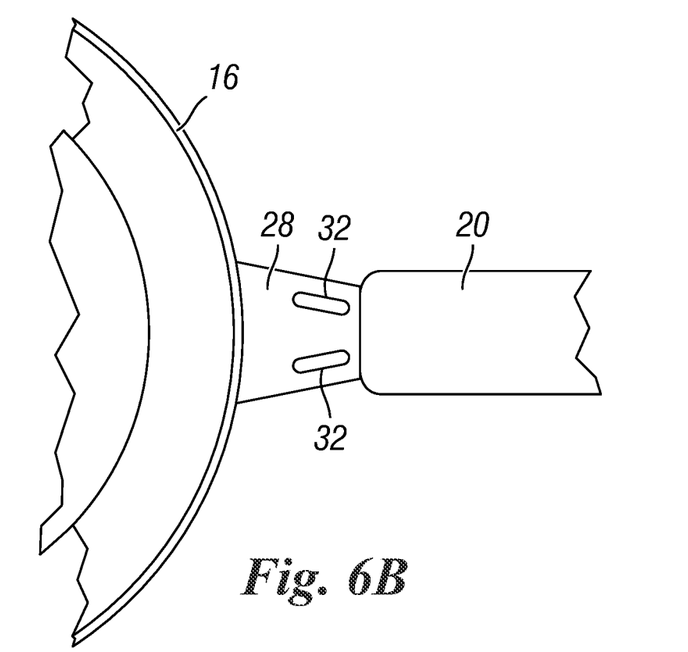
Figure 6C:
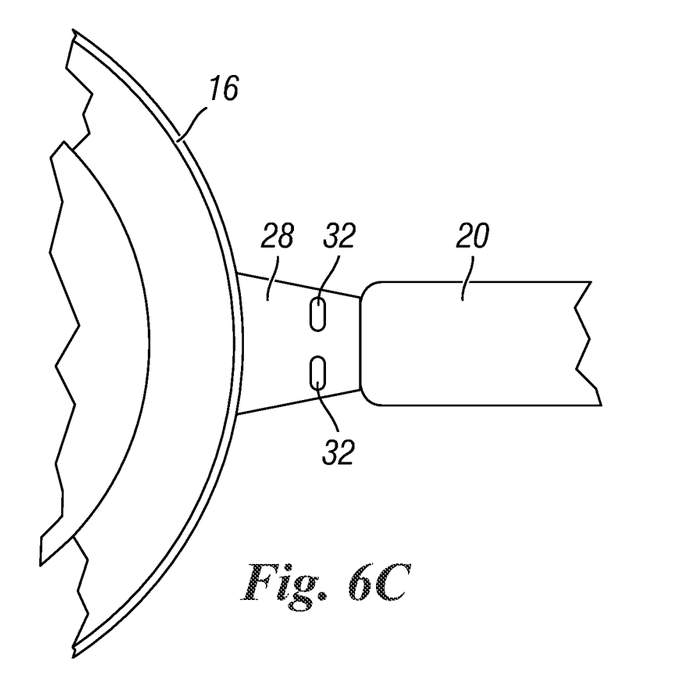
Figure 7:
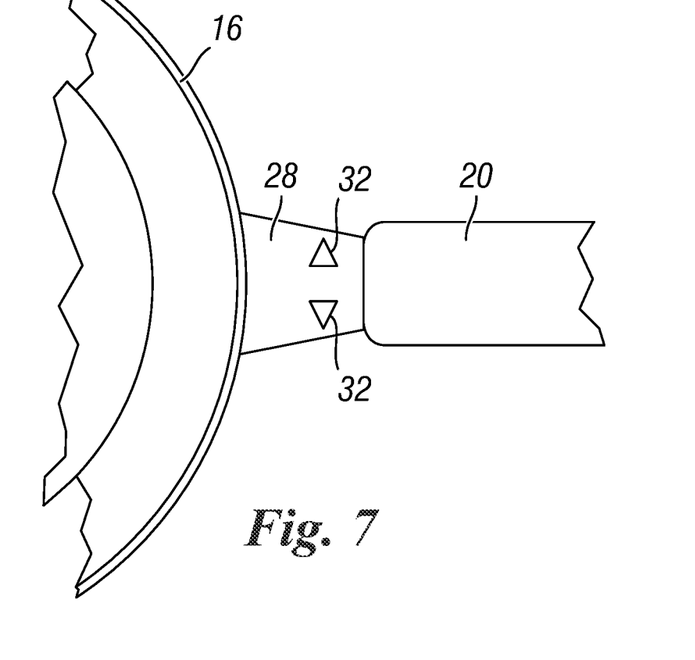

FIG. 4 schematically shows a bimetal sheet 30 having the shape of an open ring or C-ring wherein the first strip 30A of the first metal material has a coefficient of thermal expansion greater than that of the second strip 30B of the second metal material. In addition, the first strip 30A of the first metal material is placed on the outer surface of the open ring. The thicknesses of the first metal material and of the second metal material that make up the bimetal sheet are relatively low in order to get more significant movements of the bimetal sheet 30 itself. Preferably the first strip 30A of a first metal material has a thickness greater than that of the second strip 30B of a second metal material. For example, in the case of the previously mentioned metal materials, the first aluminium strip 30A might have a thickness ranging from 0.2 mm to 0.3 mm, whereas the second steel strip 30B might have a thickness ranging from 0.1 mm to 0.15 mm.

In the case of metal materials of different natures, such as, for example, in the case wherein both metal materials consist of steels with different coefficients of thermal expansion, the thicknesses of such metal materials are properly and reciprocally calibrated and can result in significant movements even with reduced overall thicknesses, such as, for example, about 0.2 mm.

Figure 8:
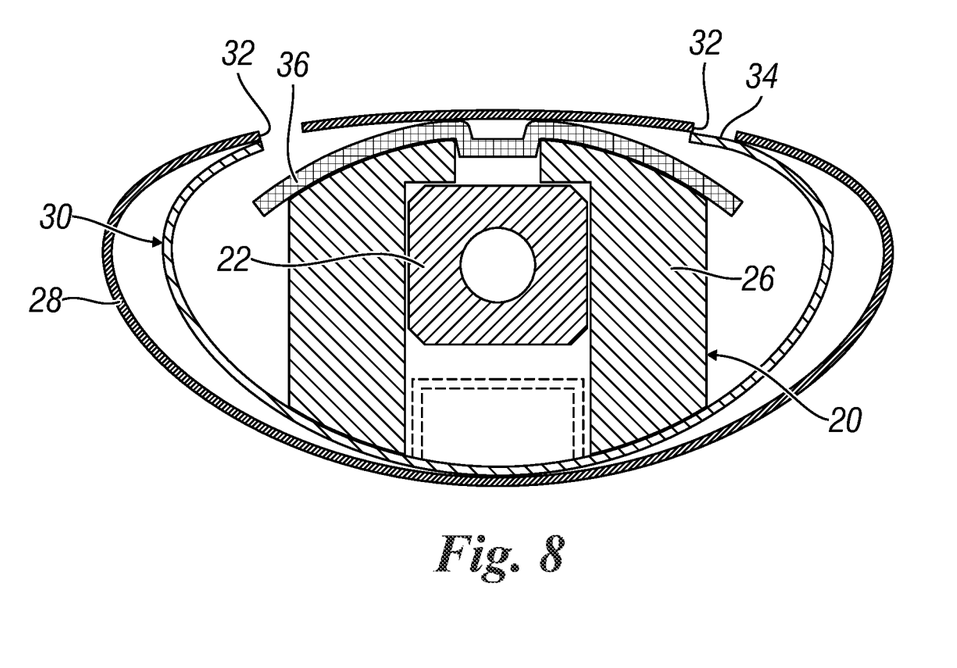
FIG. 8 shows possible operating configurations of an embodiment of the enhanced thermal signalling device according to the present invention.

FIG. 8 shows, on the left-hand side of the section of the handle 20, the configuration of the bimetal sheet 30 at the ambient temperature, wherein the plate 36 is visible through the through hole, slot or window 32. The right-hand side of the section of the handle 20 conversely shows the configuration of the bimetal sheet 30 upon reaching the predefined heating value, wherein the indicating portion 34 is visible through the through hole, slot or window 32 as resulting from the closing movement of the ring that makes up the bimetal sheet 30 itself.

Figure 9:
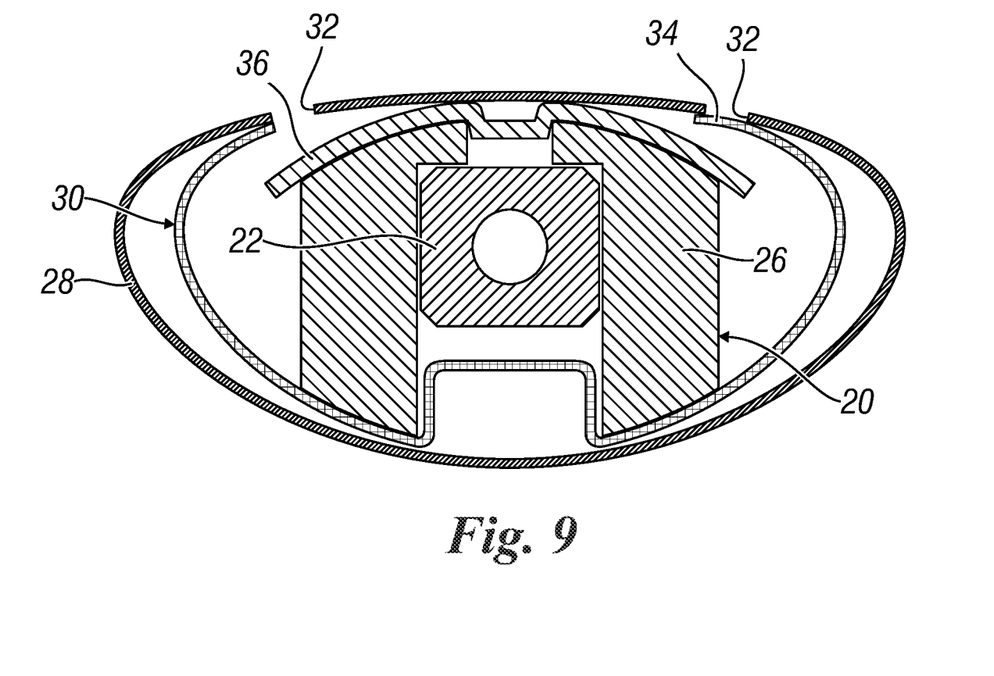
FIG. 9 shows possible operating configurations of another embodiment of the enhanced thermal signalling device according to the present invention.
Figure 10:
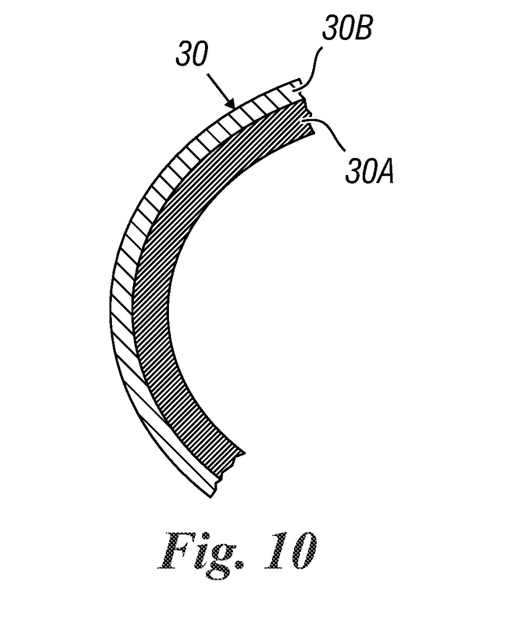
FIG. 10 is an enlarged view of a detail of the enhanced thermal signalling device of FIG. 9.

Obviously, the bimetal sheet 30 might be implemented with the metal materials being reversed with respect to the positions shown in FIG. 4. As a matter of fact, FIGS. 9 and 10 schematically show a bimetal sheet 30 having the shape of an open ring or a C-ring, wherein the first strip 30A of the first metal material still has a coefficient of thermal expansion greater than that of the second strip 30B of the second metal material. However, the first strip 30A of the first metal material is here placed on the inner surface of the open ring. In this event, the ring, by getting hot, expands. In other words, if the open ends of the C-shaped bimetal sheet 30 are at a given distance L under ambient temperature conditions, then such open ends will tend to move away from each other as temperature increases, thus progressively increasing the distance L. According to this operating configuration, the bimetal sheet 30 progressively disengages its own indicating portions 34 from the through holes, slots or windows 32 as temperature increases.

Thus, according to this operating configuration, in order to have the attainment of the predefined heating value signalled, it will be sufficient to colour the plate 36 or the end 26 of the handle 20 with the first predefined colour, preferably red. The indicating portions 34 of the bimetal sheet 30 will be conversely coloured with the second predefined colour, preferably green. In this event, it is the second predefined colour (green) of the indicating portions 34 of the bimetal sheet 30 that will be at least partially visible through the through holes, slots or windows 32 under ambient temperature conditions. Alternatively, the indicating portions 34 of the bimetal sheet 30 might have no specific colours whatsoever, so that, under ambient temperature conditions, only the natural colour (obviously different from the first predefined colour of the plate 36) of the second metal material that forms the second strip 30B of such bimetal sheet 30 will be visible through the through holes, slots or windows 36.

Consequently, whenever the bimetal sheet 30 expands because of thermal effect, it is the first predefined colour (red) of the plate 36 underneath that is at least partially visible through the through holes, slots or windows 32. This operating configuration of the bimetal sheet 30 is illustrated in FIG. 9, where the configuration of the bimetal sheet 30 at the ambient temperature is shown on the right-hand side of the section of the handle 20 (the second predefined colour of the indicating portions 34 of the bimetal sheet 30 is visible), whereas the configuration of the bimetal sheet 30 upon reaching the predefined heating value is shown on the left-hand side of the section of the handle 20 (the first predefined colour of the plate 36 is visible), showing the opening movement of the ring that makes up the bimetal sheet 30 itself.

Figure 11:
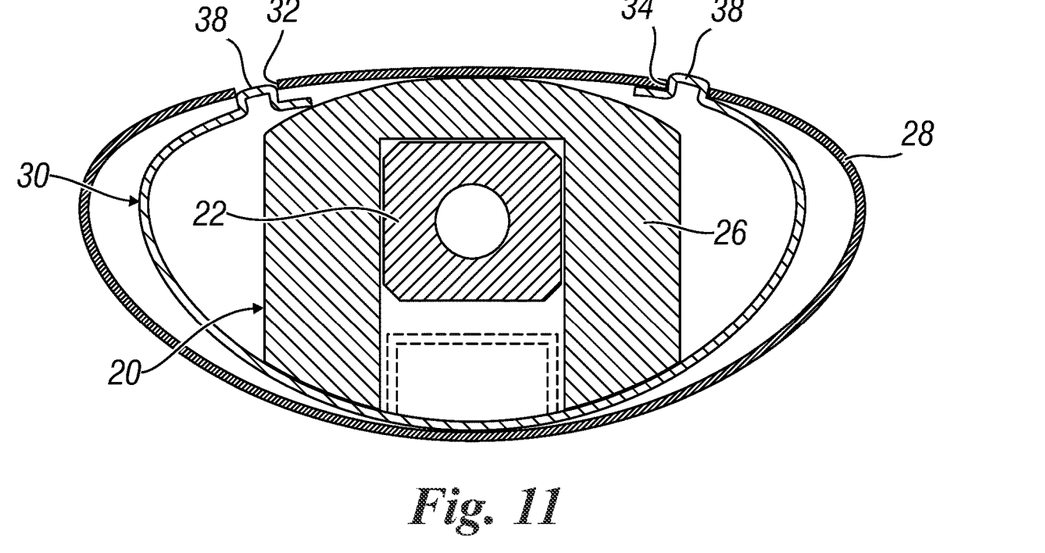
FIGS. 11, 12, and 13 show further embodiments of the enhanced thermal signalling device according to the present invention.
Figure 12:
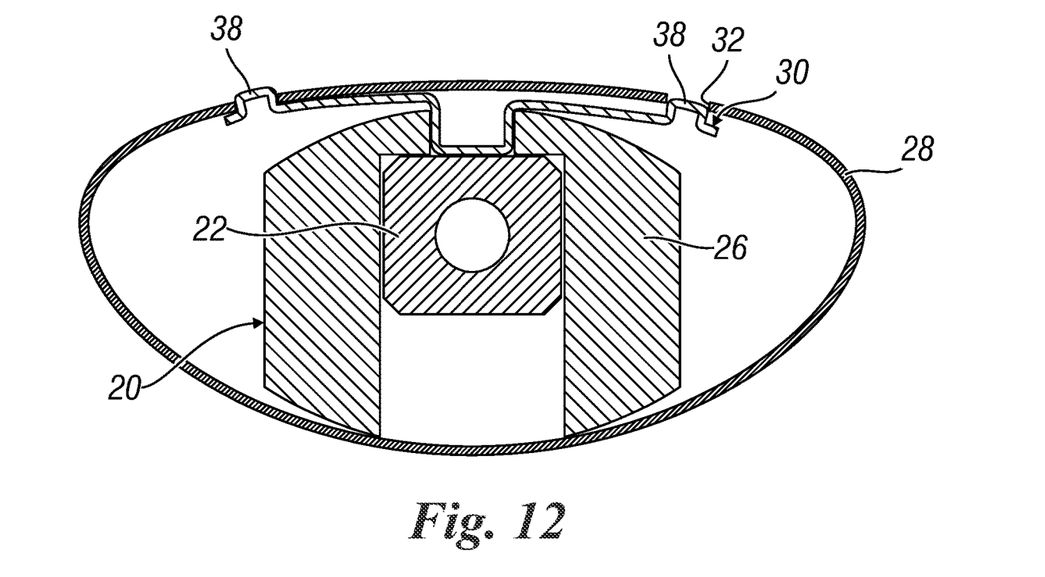
Figure 13:
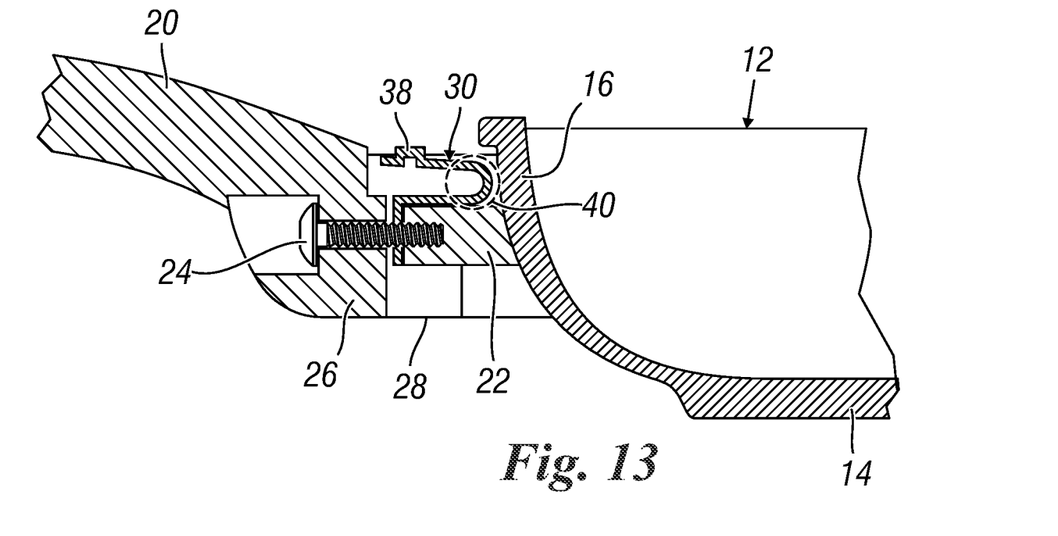

An alternative way of taking advantage of the bimetal sheet 30 getting deformed in order to signal a given thermal status is shown in FIGS. 11 to 13. In these embodiments, the indicating portions 34 of the bimetal sheet 30 are provided with respective protuberances 38 preset for rising through respective through holes, slots or windows 32 upon reaching the predefined heating value. In other words, in the hot conditions of the cooking vessel 10 the protuberances 38 come out and are at least partially visible through the through holes, slots or windows 32 drilled on the metal flame guard ring 28. Conversely, these protuberances 38 remain hidden under ambient temperature conditions, or in any case in the presence of temperatures lower than said predefined heating value.

In this operating configuration of the bimetal sheet 30, the attainment of the predefined heating value is thus signalled by the protuberances 38 coming out from the through holes, slots or windows 32 made on the metal flame guard ring 28. The surfaces of the protuberances 38 might be conveniently coloured with a predefined colour, preferably red, to indicate the hot thermal status of the cooking vessel 10. FIGS. 11 and 12 show, on one side, the ambient temperature configuration (protuberances 38 hidden) and, on the other side, the configuration upon reaching the predefined heating value (protuberances 38 projecting through their respective through holes, slots or windows 32).

Figure 14:
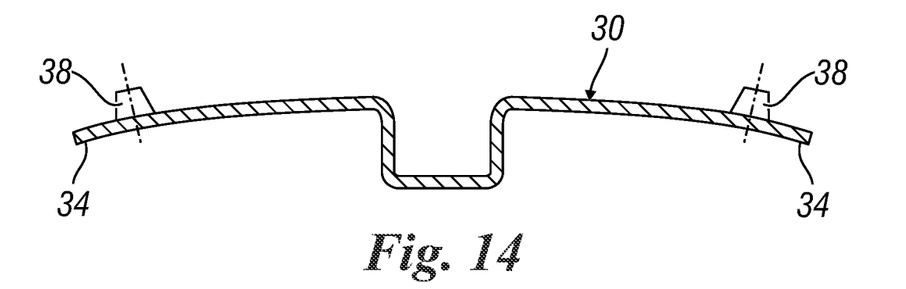
FIGS. 14 and 15 are enlarged views of the thermal signalling devices shown in FIGS. 12 and 13 respectively.
Figure 15:
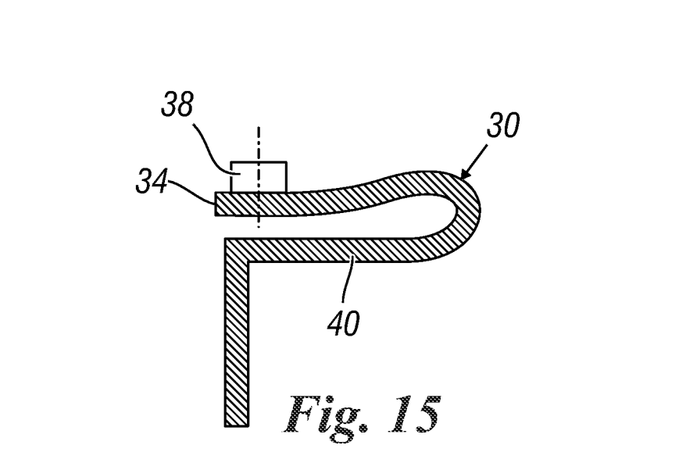

As shown in FIGS. 14 and 15, every protuberance 38 of the bimetal sheet 30 can be obtained, at the respective indicating portion 34, either through a drawing process, or by applying an added element, which just constitutes a respective protuberance 38 onto every indicating portion 34.

In the embodiment illustrated in FIG. 12, the bimetal sheet 30 features a substantially arched shape. Conversely, in the embodiment illustrated in FIG. 13, the bimetal sheet 30 is provided with an inner, elongate, substantially U-shaped portion 40, placed in contact with at least the metal fixing element 22 and operating as a motion amplifying loop for the bimetal sheet 30. This inner portion 40 enables the bimetal sheet 30 to have substantial movements as compared to the reduced dimensions of the bimetal sheet 30 itself. In addition, as shown in FIG. 13, the bimetal sheet 30 of FIG. 12 can be simultaneously put in contact both with the metal flame guard ring 28 and with the metal fixing element 22, and further with the screw 24 which constrains the handle 20 to the metal fixing element 22.

Irrespective of the embodiments of the bimetal sheet 30 described above, it is worth emphasizing that the thermal signalling devices based on bimetal sheets are physically reversible. Consequently, whenever the cooking vessel 10 cools down, the bimetal sheet 30 comes back to its own initial conditions, typically specified for the ambient temperature, and is ready again for use.

It has been thus demonstrated that the thermal signalling device for a vessel for cooking food according to the present invention achieves the previously highlighted objects, and specifically offers the following advantages:

- the movement of the bimetal sheet, being essentially a mechanical movement, provides repetitiveness, reliability, and stability;
- there are no alterable elements, such as thermochromic pigments or electronic circuits;
- if any (red, green) signalling paints are used, they can be selected from high temperature stable paints;
- the thermal signalling device comprises simple and easy to manufacture elements and its reduced dimensions facilitate cost control;
- it is possible to program the thermal signalling device for more or less rapid responses by varying the combinations of materials/thicknesses of the metal material strips that form the bimetal sheet;
- a progressive temperature indication can be provided.

The thus conceived thermal signalling device for a vessel for cooking food according to the present invention is in any case susceptible of numerous modifications and variants, all falling within one and the same inventive concept; also, all details can be replaced by technically equivalent elements. In practice, the materials used, as well as shapes and dimensions, might be whatsoever depending on the technical requirements.

Therefore, the scope of protection of the invention is that set forth in the attached claims.

The invention claimed is:

1. A vessel for cooking food, comprising:
   a metal body comprising a bottom wall and at least one side wall, wherein said side wall extends from said bottom wall to define an inner compartment of the cooking vessel (10) in which the food is arranged for being cooked;
   at least one handle, constrained to a portion of the metal body by a metal fixing element;
   at least one metal flame guard ring having a substantially annular shape, arranged around an end of the handle located at said metal fixing element, said metal flame guard ring being placed in contact with a portion of the metal body to allow thermal conduction between said metal body and said metal flame guard ring; and
   at least one thermal signalling device comprising at least one bimetal sheet,
   wherein the bimetal sheet is placed at least partially in contact with one or more components of the cooking vessel which have thermal conductivity properties,
   wherein the thermal signalling device is arranged to signal the achievement of a preset heating value of the cooking vessel with a progressive mechanical movement of said bimetal sheet related to the heating of the cooking vessel, and
   wherein the metal flame guard ring is provided with one or more through holes, slots or windows,
   wherein said bimetal sheet consists of a first strip of a first metal material and a second strip of a second metal material welded together, said first metal material and said second metal material having different coefficients of thermal expansion, and
   said bimetal sheet is shaped and dimensioned that at least one indicating portion of said bimetal sheet is at least partially visible through said through holes, slots or windows at a specific temperature value.

2. The cooking vessel according to claim 1, wherein the bimetal sheet has an open or substantially arched ring shape.

3. The cooking vessel according to claim 2, wherein the first strip of the first metal material has a coefficient of thermal expansion which is greater than that of the second strip of the second metal material, said first strip of the first metal material being placed on the outer surface of the open ring, so that the open ends of said open ring, provided with respective indicating portions, tend to get closer to each other as temperature increases, thus obstructing said through holes, slots or windows.

4. The cooking vessel according to claim 3,
wherein at least the indicating portions of the bimetal sheet are coloured with a first predefined colour, and different from the colour with which the remaining portions of said bimetal sheet are coloured, said first predefined colour being at least partially visible through said through holes, slots or windows upon reaching said predefined heating value, and
the end of the handle is coloured with a second predefined colour, and different from said first predefined colour, said second predefined colour being at least partially visible through said through holes, slots or windows under ambient temperature conditions.

5. The cooking vessel according to claim 2, wherein the first strip of the first metal material has a coefficient of thermal expansion which is greater than that of the second strip of the second metal material, said first strip of the first metal material being placed on the inner surface of the open ring, so that the open ends of said open ring, provided with respective indicating portions, tend to move away as temperature increases, thus opening said through holes, slots or windows.

6. The cooking vessel according to claim 5,
wherein at least the indicating portions of the bimetal sheet are coloured with a second predefined colour, and different from the colour with which the remaining portions of said bimetal sheet are coloured, said second predefined colour being at least partially visible through the through holes, slots or windows under ambient temperature conditions, and
the thermal signalling device comprises at least one plate placed at said through holes, slots or windows, said plate being coloured with a first predefined colour, and different from said second predefined colour, said first predefined colour being at least partially visible through said through holes, slots or windows upon reaching said predefined heating value.

7. The cooking vessel according to claim 5,
wherein the indicating portions of the bimetal sheet do not have any specific colour, so that, under ambient temperature conditions, only the natural colour of the second metal material which forms the second strip of said bimetal sheet is visible through the through holes, slots or windows, and
the thermal signalling device comprises at least one plate located at said through holes, slots or windows, said plate being coloured with a first predefined colour, and different from said natural colour, said first predefined colour being at least partially visible through said through holes, slots or windows upon reaching said predefined heating value.

8. The cooking vessel according to claim 1, wherein the cooking vessel comprises two or more through holes, slots or windows aligned with each other, so that, as temperature increases, the number of through holes, slots or windows through which said coloured indicating portions are visible also increases, arrangement and geometry of said through holes, slots or windows thus allowing to provide information about the progressive increase of the temperature of the cooking vessel.

9. The cooking vessel according to claim 1, wherein the bimetal sheet is provided with an elongated, substantially U-shaped inner portion, placed in contact with at least said metal fixing element and operating as a motion amplifying loop for said bimetal sheet.

10. The cooking vessel according to claim 1, wherein a ratio between the coefficient of thermal expansion of the first metal material and the coefficient of thermal expansion of the second metal material is at least 1.4:1.

11. The cooking vessel according to claim 1, wherein the first metal material and the second metal material are aluminium and steel respectively.

12. The cooking vessel according to claim 1, wherein the first strip of a first metal material has a thickness greater than that of the second strip of a second metal material.

13. The cooking vessel according to claim 1, wherein said component of the cooking vessel featuring good thermal conductivity properties is selected from a group comprising one or more of the following components:
the metal flame guard ring;
the metal fixing element;
a screw which fastens the handle to said metal fixing element.

14. The cooking vessel according to claim 1, wherein the indicating portions of the bimetal sheet are provided with respective protuberances arranged to lift and to be at least partially visible through respective through holes, slots or windows upon reaching said predefined heating value.

15. The cooking vessel according to claim 14, wherein the surfaces of said protuberances are coloured with a predefined colour, to indicate the hot thermal status of the cooking vessel.

16. The cooking vessel according to claim 14, wherein each of said protuberances is obtained, at the respective indicating portion, through a drawing process.

17. The cooking vessel according to claim 14, wherein each of said protuberances is obtained by applying an added element onto said indicating portions, each added element forming a respective protuberance.

18. The cooking vessel according to claim 4, wherein the first predefined color is red, and the second predefined color is green.

19. The cooking vessel according to claim 6, wherein the second predefined color is green.

20. The cooking vessel according to claim 7, wherein the first predefined color is red.

* * * * *